US010321037B2

(12) United States Patent
Uyeno et al.

(10) Patent No.: US 10,321,037 B2
(45) Date of Patent: Jun. 11, 2019

(54) ACTIVE PUSHBROOM SCANNING SYSTEM AND METHOD

(71) Applicant: RAYTHEON COMPANY, Waltham, MA (US)

(72) Inventors: Gerald P. Uyeno, Tucson, AZ (US); Sean D. Keller, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 278 days.

(21) Appl. No.: 15/335,886

(22) Filed: Oct. 27, 2016

(65) Prior Publication Data

US 2018/0124342 A1   May 3, 2018

(51) Int. Cl.
*H04N 5/225* (2006.01)
*H04N 3/10* (2006.01)
(Continued)

(52) U.S. Cl.
CPC ......... *H04N 5/2256* (2013.01); *G01S 17/023* (2013.01); *G01S 17/42* (2013.01); *G01S 17/89* (2013.01); *G06T 7/246* (2017.01); *G06T 7/73* (2017.01); *H04N 3/10* (2013.01); *H04N 5/33* (2013.01); *H04N 5/3452* (2013.01);
(Continued)

(58) Field of Classification Search
CPC .......... H04N 5/2256; H04N 3/10; H04N 5/33; H04N 5/3452; G01S 17/023; G01S 17/42; G01S 17/89; G06T 7/0042; G06T 7/2033
USPC ......... 348/294, 296, 333.01, 333.02, 333.03, 348/333.04
See application file for complete search history.

(56) References Cited

U.S. PATENT DOCUMENTS 7,745,771 B2   6/2010   Troxell et al.
8,380,025 B2   2/2013   Anderson et al.
(Continued)

FOREIGN PATENT DOCUMENTS

WO   2014200581 A2   12/2014

OTHER PUBLICATIONS

"SEEOR: Evanescently Coupled Non-mechanical Beam Steering", Vescent Photonics, 2015 [retrieved on Sep. 2, 2016 ], <URL: http://www.vescent.com/wp-content/uploads/2015/04/LS-1uJ7.1.pdf>.
(Continued)

*Primary Examiner* — Sinh Tran
*Assistant Examiner* — Zhenzhen Wu
(74) *Attorney, Agent, or Firm* — Lando & Anastasi, LLP

(57) ABSTRACT

Aspects and embodiments are generally directed to active imaging systems and methods. In one example, an active imaging system includes a positioning system configured to detect a direction of motion of the imaging system relative to a scene, an optical source positioned to emit electromagnetic radiation, a non-mechanical beamsteering device positioned to receive the electromagnetic radiation from the optical source and configured to scan the electromagnetic radiation over at least a first portion of the scene within an instantaneous field-of-view of an optical receiver, and the optical receiver positioned to receive reflections of the electromagnetic radiation from at least the first portion of the scene within the instantaneous field-of-view, wherein the first portion of the scene is within a first edge region of the instantaneous field-of-view of the optical receiver, the first edge region being in the direction of motion of the imaging system.

21 Claims, 5 Drawing Sheets

(51) Int. Cl.
  *H04N 5/33*    (2006.01)
  *H04N 5/345*   (2011.01)
  *G01S 17/02*   (2006.01)
  *G01S 17/42*   (2006.01)
  *G01S 17/89*   (2006.01)
  *G06T 7/73*    (2017.01)
  *G06T 7/246*   (2017.01)
  *G02F 1/13*    (2006.01)
  *G01S 7/481*   (2006.01)
  *G01S 7/499*   (2006.01)

(52) U.S. Cl.
  CPC ............ *G01S 7/4818* (2013.01); *G01S 7/499* (2013.01); *G02F 1/1326* (2013.01); *G02F 2203/24* (2013.01)

(56) References Cited

U.S. PATENT DOCUMENTS

| | | | |
|---|---|---|---|
| 8,400,619 B1 | 3/2013 | Bachrach et al. | |
| 8,463,080 B1 | 6/2013 | Anderson et al. | |
| 8,800,870 B1* | 8/2014 | Burkland | G01S 17/89 235/400 |
| 8,970,740 B2 | 3/2015 | Herman et al. | |
| 8,989,523 B2 | 3/2015 | Anderson et al. | |
| 2008/0166024 A1* | 7/2008 | Iketani | B60R 1/00 382/107 |
| 2013/0021474 A1* | 1/2013 | Taylor | G01S 17/89 348/144 |
| 2013/0100538 A1* | 4/2013 | Kim | G02B 13/009 359/683 |
| 2014/0152793 A1 | 6/2014 | Staker et al. | |
| 2015/0285625 A1* | 10/2015 | Deane | G01S 17/10 348/140 |
| 2017/0347024 A1* | 11/2017 | Yanagi | H04N 5/265 |

OTHER PUBLICATIONS

Ayral et al., "Phase-Conjugate Nd:YAG Laser with Internal Acousto-Optic Beam Steering", Optics Letters, vol. 16, No. 16, Aug. 15, 1991, pp. 1225-1227.
Chiu et al., "Shape-Optimized Electrooptic Beam Scanners: Analysis, Design, and Simulation", IEEE, Journal of Light Wave Technology, vol. 17, No. 1, Jan. 1999, pp. 108-114.
Kim et al., "Wide-Angle, Nonmechanical Beam Steering Using Thin Liquid Crystal Polarization Gratings", Proc. of SPIE, vol. 7093, 2008.

* cited by examiner

ACTIVE PUSHBROOM SCANNING SYSTEM AND METHOD

BACKGROUND

Typical active optical systems use laser radiation to image a scene. The scene is imaged by sensing reflections of the laser radiation at a detector, which can often include a Focal Plane Array (FPA). FPAs generally include an array of pixels organized in rows and columns. A circuit associated with each pixel of the FPA accumulates charge corresponding to the flux of incident radiation at the corresponding pixel. Typically, the charge within the pixel is accumulated at a capacitive element, which produces a voltage proportional to the accumulated charge. The resulting voltage is conveyed by additional circuitry to an output of the FPA, and may be used to generate an image of the scene.

SUMMARY OF THE INVENTION

Aspects and embodiments are generally directed to active imaging systems and methods, and, in particular, to active imaging systems and methods which include solid-state active optical elements for active scanning applications. In certain examples, the active imaging system includes a non-mechanical beamsteering device which directs illumination over a desired extent of a scene based on a detected direction of motion of the imaging system. Specifically, the system may image a leading edge of an instantaneous field-of-view of an optical receiver, or may track one or more varying features within the instantaneous field-of-view, based on the detected direction of motion. Accordingly, various aspects and embodiments provide an imaging system configured to perform rapid imaging scans based on the movement of the imaging system (or variations in motion of a feature within a scene) while maintaining a reduced weight, size, and power consumption for ground, mobile, maritime, airborne, and space imaging environments.

According to an aspect, provided is an active imaging system. In one example, the active imaging system comprises a positioning system configured to detect a direction of motion of the imaging system relative to a scene to be imaged, an optical source positioned to emit electromagnetic radiation along a transmit path, a non-mechanical beamsteering device positioned along the transmit path to receive the electromagnetic radiation from the optical source and configured to scan the electromagnetic radiation over at least a first portion of the scene within an instantaneous field-of-view of an optical receiver, and the optical receiver positioned to receive reflections of the electromagnetic radiation from at least the first portion of the scene within the instantaneous field-of-view, and the first portion of the scene is within a first edge region of the instantaneous field-of-view of the optical receiver, the first edge region being in the direction of motion of the imaging system.

According to an embodiment, the optical receiver is a focal plane array including a plurality of pixels arranged in a series of rows and columns. In one embodiment, the active imaging system further comprises a Read-Out Integrated Circuit (ROIC) coupled to the focal plane array and configured to activate a subset of the plurality of pixels of the focal plane array to receive the reflections of the electromagnetic radiation, and the subset of the plurality of pixels corresponds to the first edge region of the instantaneous field-of-view. In an embodiment, the subset of the plurality of pixels includes at least one of a single row of pixels or a single column of pixels.

In one embodiment, the active imaging system further comprises control circuitry coupled to the positioning system, the control circuitry configured to locate the first portion of the scene within the instantaneous field-of-view of the optical receiver based at least in part on the direction of motion of the imaging system.

According to an embodiment, the positioning system is further configured to detect the direction of motion within a first single-dimensional direction within a plane of the optical receiver, and the first edge region of the instantaneous field-of-view is in the direction of motion of the imaging system within the first single-dimensional direction. In an embodiment, the positioning system is further configured to detect the direction of motion within a two-dimensional direction, and the two-dimensional direction includes the first single-dimensional direction and a substantially orthogonal second single-dimensional direction within the plane of the optical receiver. In one embodiment, the non-mechanical beamsteering device is further configured to scan the electromagnetic radiation over at least a second portion of the scene, and the second portion of the scene corresponds to a second edge region of the instantaneous field-of-view of the optical receiver in the direction of motion of the imaging system within the second single-dimensional direction.

According to an embodiment, the control circuitry is coupled to the optical receiver and further configured to generate a plurality of images of the scene, and at least one image of the plurality is a composition of an image of the first portion of the scene and a previous image. In one embodiment, the optical receiver is further configured to collect at least one Bidirectional Reflectance Distribution Function (BRDF) sample.

In one embodiment, the positioning system includes a global positioning system (GPS). In an embodiment, the non-mechanical beamsteering device includes a liquid crystal waveguide. According to one embodiment, the optical source includes an active laser source configured to emit shortwave infrared (SWIR) radiation in a wavelength range of approximately 0.9-1.7 micrometers. In one embodiment, the active imaging system further comprises control circuitry coupled to the optical receiver and configured to generate a plurality of images of the scene, and the positioning system is configured to detect the direction of motion of the imaging system relative to the scene based at least in part on a variation of a feature within the scene between a first image of the plurality and a second image of the plurality.

According to an aspect, provided is a method of optical imaging. In one example, the method includes the acts of detecting a direction of motion relative to a scene to be imaged, emitting electromagnetic radiation from an optical source along a transmit path, scanning the electromagnetic radiation over at least a first portion of the scene, the first portion of the scene corresponding to a first edge region of an instantaneous field-of-view of an optical receiver, in the direction of motion, and receiving, within the instantaneous field-of-view of the optical receiver, reflections of the electromagnetic radiation from at least the first portion of the scene.

According to an embodiment, the method further comprises activating a subset of a plurality of pixels of the optical receiver to receive the reflections of the electromagnetic radiation, and the subset of the plurality of pixels corresponds to the first edge region of the instantaneous field-of-view. In an embodiment, activating the subset of the plurality of pixels includes activating at least one of a single row of pixels or a single column of pixels of the optical receiver.

In one embodiment, detecting the direction of motion includes detecting the direction of motion within a first single-dimensional direction within a plane of the optical receiver, and the first edge region of the instantaneous field-of-view is in the direction of motion within the first single-dimensional direction. According to an embodiment, detecting the direction of motion includes detecting the direction of motion within a two-dimensional direction, and the two-dimensional direction includes the first single-dimensional direction and a substantially orthogonal second single-dimensional direction within the plane of the optical receiver. In one embodiment, the method further comprises scanning the electromagnetic radiation over at least a second portion of the scene, and the second portion of the scene corresponds to a second edge region of the instantaneous field-of-view of the optical receiver in the direction of motion within the second single-dimensional direction.

According to certain aspects, provided is an active imaging system. In one example, the active imaging system comprises a signal processor configured to detect changes in the image, an optical source positioned to emit electromagnetic radiation along a transmit path, a non-mechanical beamsteering device positioned along the transmit path to receive the electromagnetic radiation from the optical source and configured to scan the electromagnetic radiation over all possible portions of an instantaneous field-of-view of an receiver that could change, and the optical receiver positioned to receive, within the field of view, reflections of the electromagnetic radiation from all the possible portions of the instantaneous field-of-view that could change, wherein the portion of the instantaneous field-of-view that is changing is due to relative motion of the imaging system relative to the scene and/or changes to location or opacity of objects between the system and the object.

In one embodiment, the optical sensor is a focal plane array including a plurality of pixels arranged in a series of rows and columns. According to some embodiments, the active imaging system further comprises a Read-Out Integrated Circuit (ROIC) coupled to the focal plane array and configured to activate a subset of the plurality of pixels of the focal plane array to receive the reflections of the electromagnetic radiation, wherein the subset of the plurality of pixels corresponds to the portion of the instantaneous field-of-view that is changing. In one embodiment, the subset of the plurality of detectors includes at least one of a single row of detectors or a single column of detectors.

According to certain embodiments, the imaging system further comprises control circuitry coupled to the positioning system, the control circuitry configured to locate the portion of the instantaneous field-of-view that is changing based at least in part on the direction of motion of the imaging system. In one embodiment, the positioning system is further configured to detect the direction of motion within a first single-dimensional direction, and wherein the electromagnetic radiation is scanned perpendicular to the single-dimensional direction at a front edge of the instantaneous field of view. In one embodiment, the front edge is a perimeter of the instantaneous field of view intersected by a vector with an origin at the center of the instantaneous field of view in the direction of relative motion of the receiver to the scene.

In one embodiment, the positioning system is further configured to detect the direction of motion within a two-dimensional direction, and wherein the two-dimensional direction includes the first single-dimensional direction and a substantially orthogonal second single-dimensional direction. In some embodiments, the non-mechanical beamsteering device is further configured to scan the electromagnetic radiation perpendicular to the second single-dimensional direction at the front edge of the instantaneous field of view.

According to some embodiments, the control circuitry is coupled to the optical sensor and further configured to generate a plurality of images of the scene, where at least one image of the plurality is a composition of an image of the portion of the instantaneous field-of-view that is changing and a previous image. In one embodiment, the optical sensor is further configured to collect additional imagery of the same portion of the object at different angles from the optical axis of the system and to calculate the Bidirectional Reflectance Distribution Function (BRDF) sample.

In one embodiment, the positioning system includes a global positioning system (GPS). According to one embodiment, the non-mechanical beamsteering device includes a liquid crystal waveguide. In one embodiment, the optical source includes an active laser source configured to emit shortwave infrared (SWIR) radiation in a wavelength range of approximately 0.9-1.7 micrometers.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
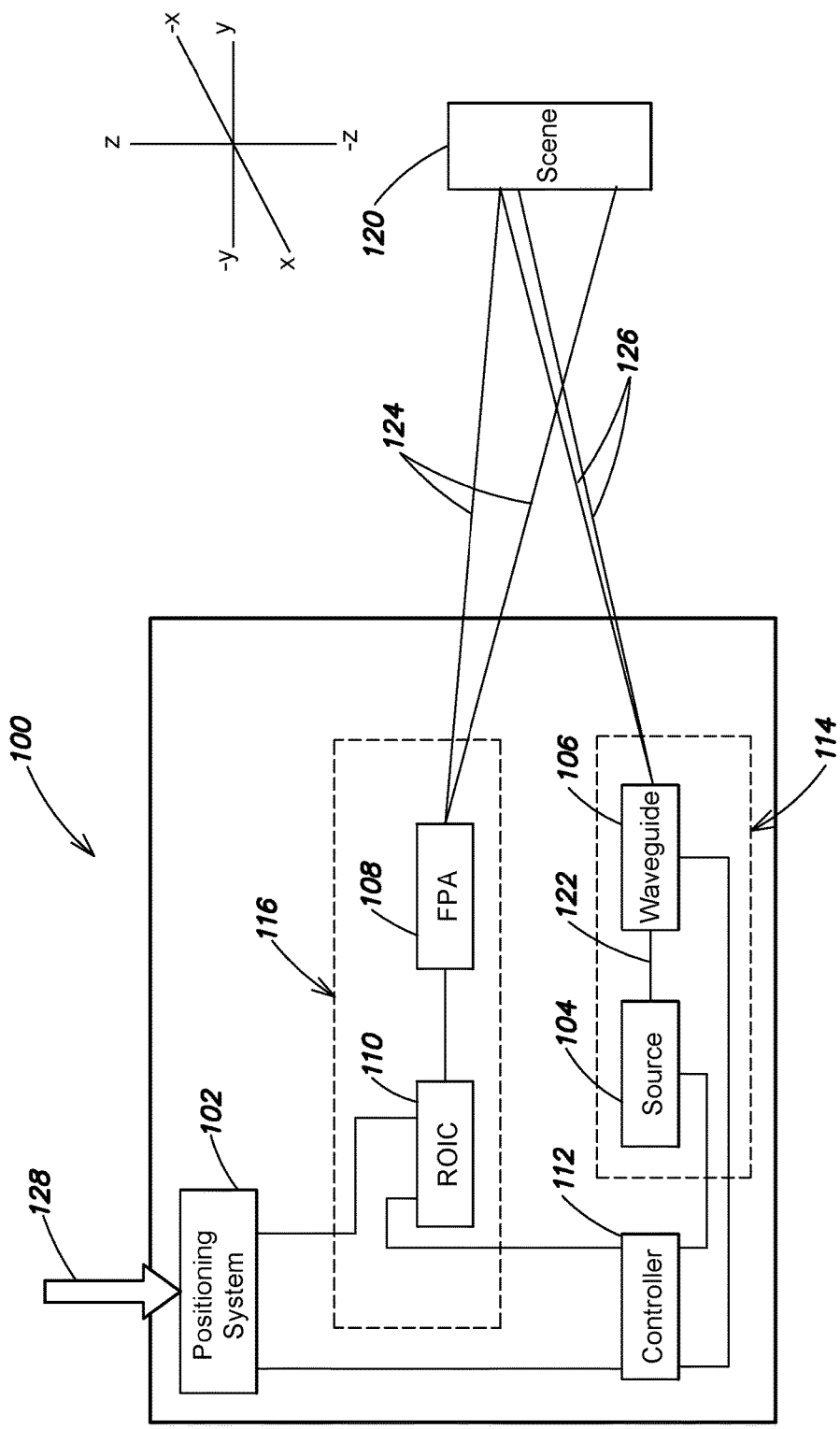
FIG. 1 is a block diagram of an example active imaging system according to aspects of the invention.

Aspects and embodiments are generally directed to active imaging systems and methods, and, in particular, to active imaging systems and methods which include solid-state active optical elements for active scanning applications. In certain examples, the active imaging system includes a non-mechanical beamsteering device which selectively directs illumination over a desired extent of a scene based on a detected direction of motion of the imaging system, or a variation in motion of one or more features within the scene. In certain examples, the active imaging system may image a leading edge of an instantaneous field-of-view of an optical receiver in the direction of motion of the imaging system. Accordingly, various aspects and embodiments provide an imaging system configured to perform rapid imaging scans based on one or more movements of the imaging system. Specifically, aspects and examples may detect the direction of motion of the imaging system to image sections of the scene as they appear within a field-of-view, or as they change.

The ability of an imaging system to accurately convert optical energy to digital information is generally dependent on the sensitivity of the detector, and the intensity of the illumination emitted by the optical source. For example, in various conventional imaging approaches, the optical source is positioned to continuously illuminate the entire scene within a field-of-view of a receiver. Such an approach can consume a great deal of power when continuously providing the intensity of illumination necessary for high-contrast imaging across the entire scene. Alternative approaches to imaging utilize mechanical beamsteering optics, such as gimbal-based systems. Gimbals allow the physical displacement (e.g., rotation) of the system to reduce power consumption and enable selective aiming. However, these alternative approaches to imaging are, in general, limited by the capability of the mechanical elements. Limitations may include, but are not limited to, the speed of the executed scan and the pattern illumination. Moreover, these mechanical assemblies can be complex, and may increase the weight and cost of the imaging system and associated elements, such as motion compensating elements.

Accordingly, various aspects and embodiments discussed herein provide an active imaging system configured to perform rapid imaging scans based on the movements of the imaging system, while maintaining a reduced weight, size, and power consumption when compared to typical imaging systems. Various other advantages and benefits of the active imaging system and methods described herein are discussed below with reference to FIGS. 1-5.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a block diagram of an example active imaging system 100 according to certain aspects and examples. Among other components, the active imaging system 100 may include a positioning system 102, an optical source 104, a non-mechanical beamsteering device 106, and an optical receiver 108. As illustrated, in certain examples the active imaging system 100 may further include a Read-Out Integrated Circuit (ROIC) 110 and control circuitry 112. In certain examples, components of the active imaging system 100 may be separated into one or more subsystems, such as the illustrated scanning subsystem 114 and the illustrated detection subsystem 116. Each of the subsystems 114, 116 may include various additional components in optical and/or electrical communication, as further discussed herein.

Though the components of several views of the drawings herein may be shown and described as discrete elements in a block diagram and may be referred to as "circuitry," unless otherwise indicated, the elements may be implemented as one of, or a combination of, analog circuitry, digital circuitry, or one or more microprocessors executing software instructions. Unless otherwise indicated, signal lines may be implemented as discrete analog or digital signal lines. Some of the processing operations may be expressed in terms of calculating, determining, and/or ascertaining. The equivalent of calculating, determining, and/or ascertaining can be performed by other analog or digital processing techniques and are included within the scope of this application. Unless otherwise indicated, signals may be encoded in either digital or analog form; conventional digital-to-analog or analog-to-digital converters may not be shown in the drawings.

Referring to the example active imaging system 100 illustrated in FIG. 1, the active imaging system 100 may include a positioning system 102 configured to detect a direction of motion of the imaging system 100 relative to a scene (e.g., scene 120). The positioning system 102 may be coupled to the control circuitry 112 and one or more components of the detection subsystem 116, such as the ROIC 110. In certain examples, the positioning system 102 may include a Global Positioning System (GPS) configured to receive GPS positioning information, such as time and location data 128. The GPS system may in certain embodiments include a GPS transceiver which sends and receives GPS positioning information with one or more GPS satellites. The GPS transceiver derives a three-dimensional position of the imaging system 100 based at least in part on a plurality of GPS position signals, each GPS signal being received from a respective GPS satellite. For instance, the GPS transceiver may convert the position derived from the positioning information to a longitude, latitude, and height relative to an Earth-based model. Based on a series of consecutive position measurements (e.g., longitude, latitude, and height), the positioning system 102 may determine the direction of motion of the imaging system 100, relative to the scene.

While illustrated as separate from the control circuitry 112 of the active imaging system 100, in certain examples, the positioning system 102 may be combined with one or more other components of the imaging system 100, such as the control circuitry 112. For example, the positioning system 102 and other combined components of the active imaging system 100 may include a combination of software-configured elements, control circuitry, signal processing circuitry, application specific integrated circuit, or any combination of various hardware and logic circuitry for performing the various processes discussed herein.

For example, in certain other implementations, the positioning system 102 may include a Digital Signal Processor (DSP) configured to detect a direction of motion of the imaging system 100 relative to the scene based at least in part on a variation of the scene (and/or of a feature within the scene) between a plurality of consecutively generated images of the scene. As further discussed below, in certain examples the control circuitry 112 may generate one or more images of the scene based on reflected electromagnetic radiation received from the scene at the optical receiver 108. The DSP may compare each consecutive image to ascertain one or more variations in the scene (and/or one or more variations in at least one feature therein) between the consecutive images. For example, each image may be time-stamped at the time of generation and variations in the scene or features may include motion in one or more dimensional directions of a coordinate system relative to the scene, such as the x-direction, y-direction, and z-direction illustrated in FIG. 1.

While discussed herein as including a GPS system and/or a DSP, in certain other examples the positioning system 102 may include any other suitable sensing system configured to detect a direction of motion of the imaging system 100. Such systems may include optical sensors and/or accelerometers, among other sensors. As further discussed below, various other components of the active imaging system 100 may perform various operations based on the detected direction of motion of the imaging system 100.

In particular examples, the positioning system 102 may detect that the direction of motion of the imaging system 100 relative to the scene is in any of a single-dimensional direction (e.g., x-direction), a two-dimensional direction (e.g., x-direction and y-direction), or a three dimensional-direction (e.g., x-direction, y-direction, and z-direction) within a plane of the optical detector 108. However, in certain other examples the positioning system 102 may also detect that there is an absence of movement of the system 100 relative to the scene. That is, in certain examples the positioning system 102 may determine that the imaging system 100 is stationary.

As discussed above, the positioning system 102 (e.g., the DSP) may determine a direction of motion of the scene based on one or more variations in a feature within the scene. Similarly, in certain examples the positioning system 102 may be configured to determine a direction of motion of a feature within the scene, relative to the imaging system 100. That is, the positioning system 102 may be configured to determine that the imaging system 100 is stationary, while one or more features within the scene (e.g., a vehicle) are moving relative to the imaging system 100. Similar to those processes described above, the positioning system 102 may identify movement of the feature within the scene, and determine the direction of movement of that feature based on incremental variations between consecutively generated images of the scene.

According to various examples, the optical source 104 is in optical communication with the non-mechanical beamsteering device 106 and configured to generate and provide a beam of electromagnetic radiation. In particular, the optical source 104 may generate the beam of electromagnetic radiation at a desired wavelength, such as any wavelength of shortwave infrared (SWIR) radiation. Accordingly, in certain examples the optical source 104 may include an active SWIR laser configured to emit SWIR radiation within a wavelength range of approximately 0.9-1.7 micrometers. However, in other examples the optical source 104 may include any other suitable source of electromagnetic radiation, such as a NIR (near-infrared) laser or a visible light source. In one embodiment, electromagnetic radiation generated by the optical source 104 is coherent, and the system 100 includes one or more collimating optics.

As illustrated in FIG. 1, the non-mechanical beamsteering device 106 is positioned to receive the transmitted beam of electromagnetic radiation from the optical source 104. For example, the mechanical beamsteering device 106 may receive the transmitted beam of electromagnetic radiation via an optical fiber or free space coupling along a transmit path 122. Responsive to receiving the electromagnetic radiation, the non-mechanical beamsteering device 106 may be controlled to direct the electromagnetic radiation generated by the optical source 104 over at least one portion of the scene. In particular, the non-mechanical beamsteering device 106 may scan the electromagnetic radiation over a portion of the scene within an instantaneous field-of-view of the optical receiver 116. This may include directing the electromagnetic radiation over a section of the scene that is less than the entire filed-of-view of the optical receiver 108, as illustrated in FIG. 1. Within FIG. 1, the instantaneous field-of-view of the optical receiver 108 is illustrated by the range 124, and the scanned electromagnetic radiation is indicated by the range 126.

In certain examples, the non-mechanical beamsteering device 106 is configured to scan the received electromagnetic radiation over a portion of the scene within an edge region of the instantaneous field-of-view of the optical receiver 108. As discussed herein, each edge region may refer to one or more sections of the perimeter of the instantaneous field-of-view of the optical receiver 108. In particular, the non-mechanical beamsteering device 106 may be configured to scan the received electromagnetic radiation over a portion of the scene within an edge region of the field-of-view that corresponds to the detected direction of motion of the imaging system 100 (e.g., a "leading" edge of the instantaneous field-of-view). For example, the control circuitry 112 may locate the portion of the scene that corresponds to the leading edge of the field-of-view based on the direction of motion detected by the positioning system 102. Once located, the control circuitry 112 may operate the non-mechanical beamsteering device 106 to scan the electromagnetic radiation in an orientation substantially perpendicular to the direction of motion, at the leading edge of the instantaneous field-of-view. In various examples, the leading edge may be intersected by a vector with an origin at the center of the instantaneous field of view in the direction of relative motion of the imaging system 100.

Figure 2:
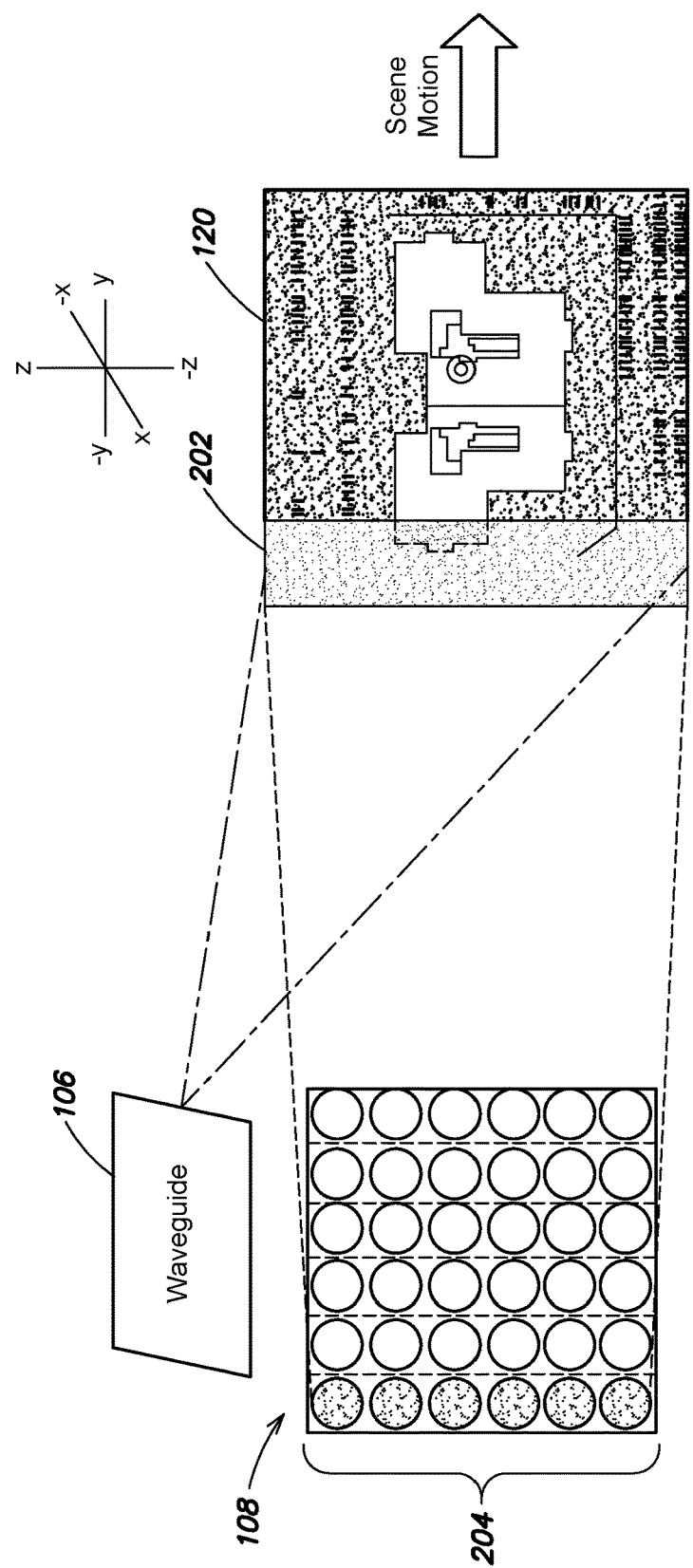
FIG. 2 is an example illustration of electromagnetic radiation received at the optical receiver of the active imaging system illustrated in FIG. 1, according to aspects of the invention.

Referring to FIG. 2, illustrated is an example of electromagnetic radiation received at the optical receiver 108 of the active imaging system 100 illustrated in FIG. 1, during one mode of operation. In particular, FIG. 2 illustrates an example of the scanning operations performed by the imaging system 100 while moving in a single-dimensional linear direction. Solely for the purpose of illustration, the direction is shown in the positive y-direction in FIG. 2. During the illustrated operations, the non-mechanical beamsteering device 106 directs electromagnetic radiation over a portion of a scene (e.g., portion 202) which corresponds to an edge region of the instantaneous field-of-view of the optical receiver 108. FIG. 2 shows the beamsteering device 106 scanning the electromagnetic radiation in the direction of motion of the imaging system 100 (i.e., the negative y-direction). As illustrated, while moving in a single-dimensional direction, the direction of motion of the scene is substantially opposite the direction of the imaging system 100. Accordingly, FIG. 2 illustrates the non-mechanical beamsteering device 106 scanning the electromagnetic radiation over the portion of the scene at the leading edge of the field-of-view. While illustrated in FIG. 2 as scanning the portion immediately adjacent the leading edge of the field-of-view, in certain examples the non-mechanical beamsteering device 106 may scan a portion of the scene slightly offset from the leading edge. Moreover, in certain other examples, the non-mechanical beamsteering device 106 may switch between various scan patterns during operation and may not remain fixed on the leading edge of the field-of-view.

Figure 3:
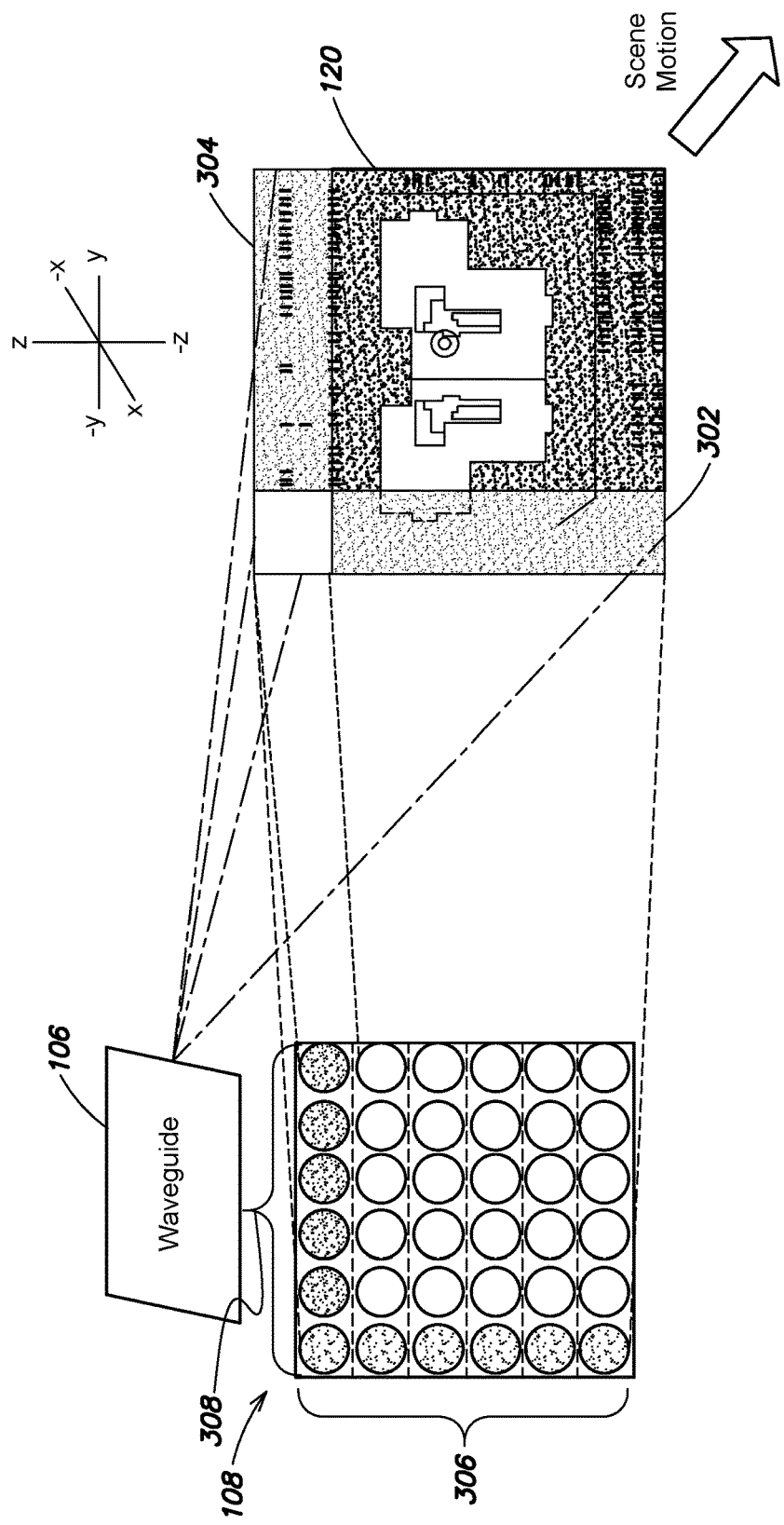
FIG. 3 is another example illustration of electromagnetic radiation received at the optical receiver of the active imaging system illustrated in FIG. 1, according to aspects of the invention.

Referring to FIG. 3, illustrated is an example of electromagnetic radiation received at the optical receiver 108 of the active imaging system 100 illustrated in FIG. 1 during another mode of operation. In particular, FIG. 3 illustrates an example of the scanning operations performed by the imaging system 100 while moving in a two-dimensional direction. Solely for the purpose of illustration, the direction of motion of the scene is shown in the positive y-direction and the negative z-direction in FIG. 3. During the illustrated operations, the non-mechanical beamsteering device 106 scans electromagnetic radiation over the portions (e.g., first portion 302 and second portion 304) of the scene which correspond to a first edge region and a second edge region of the instantaneous field-of-view, in the direction of motion. As illustrated, while moving in a two-dimensional direction, the direction of motion of the imaging system 100 is substantially opposite the direction of the scene (i.e., the negative y-direction and the positive z-direction). In the illustrated example, the direction of motion of the imaging system 100 is diagonal relative to the scene being imaged. Accordingly, the non-mechanical beamsteering device 106 illuminates the portion of the scene at the leading edge of the field-of-view in both the negative y-direction and the positive z-direction. As illustrated, the scanned illumination in each direction is in a substantially perpendicular orientation relative to the detected direction of motion. While in one example, the non-mechanical beamsteering device 106 may simultaneously scan over the first portion 302 and the second portion 304 (e.g., in a "T" shaped pattern), in other examples the beamsteering device 106 may rapidly scan the first portion 302 and the second portion 304 sequentially.

Figure 4:
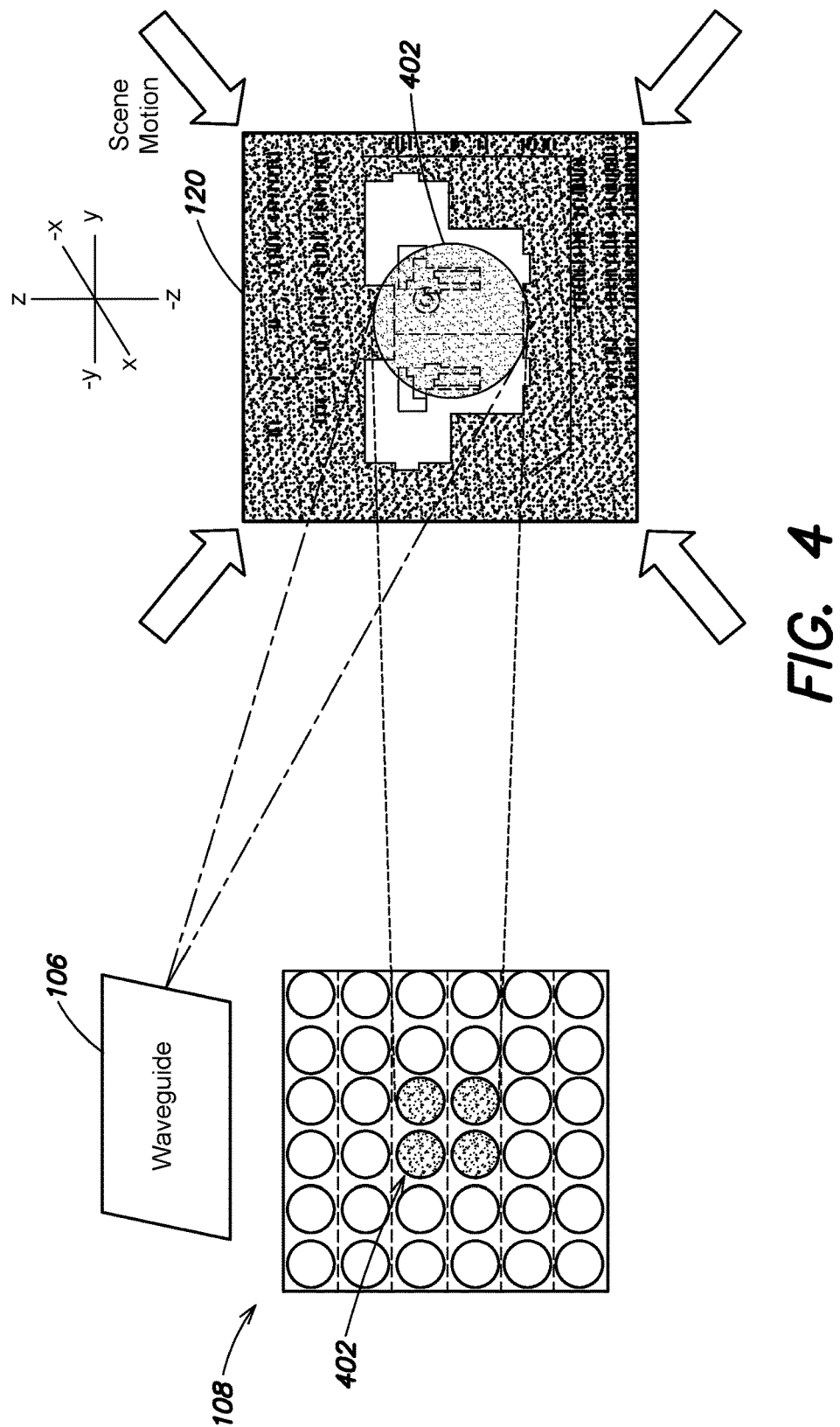
FIG. 4 is another example illustration of electromagnetic radiation received at the optical receiver of the active imaging system illustrated in FIG. 1, according to aspects of the invention.

Referring now to FIG. 4, illustrated is another example of electromagnetic radiation received at the optical receiver 108 of the active imaging system 100 illustrated in FIG. 1. Specifically, FIG. 4 illustrates the imaging system 100 during a mode of operation in which the non-mechanical beamsteering device 106 scans electromagnetic radiation over a portion of the scene (e.g., portion 402) which corresponds to a substantially center portion of the instantaneous field-of-view of the optical receiver 108. Solely for the purpose of illustration, FIG. 4 shows the direction of motion of the scene in the negative x-direction. That is, the direction of motion of the imaging system 100 is away from the scene being imaged. Accordingly, the non-mechanical beamsteering device may illuminate the portion of the scene at the leading edge of the field-of-view in the x-direction (illustrated in FIG. 4 as the center of the instantaneous field-of-view).

While FIGS. 2, 3, and 4 illustrate particular examples of scanning processes performed by the non-mechanical beamsteering device 106, in other examples, the non-mechanical beamsteering device 106 may perform other scanning processes and may dynamically switch between the modes illustrate din FIGS. 2-4 and the other scanning processes. These other scanning processes may provide various benefits during target tracking operations, such as improved accuracy, speed, and functionality. For instance, the non-mechanical beamsteering device 106 may be configured to scan electromagnetic radiation in a direction substantially parallel to the detected direction of motion of the imaging system 100 (e.g., "crabbing"). For example, the non-mechanical beamsteering device 106 may scan the electromagnetic radiation over a portion of the scene within the instantaneous field-of-view in the y-direction, while the imaging system 100 is oriented to move in the y-direction, but actually moves in the z-direction for small periods of time.

In certain other examples, the non-mechanical beamsteering device 106 may be controlled to dynamically track a feature within the instantaneous field-of-view. In such an example, the non-mechanical beamsteering device 106 may direct the electromagnetic radiation to follow a desired feature within the scene. For instance, the non-mechanical beamsteering device 106 may scan electromagnetic radiation in a direction substantially parallel and opposite to a detected direction of motion of the imaging system 100 relative to an object (e.g., a target) within the scene. In some other examples, the non-mechanical beamsteering device 106 may scan the electromagnetic radiation in a direction substantially parallel and in alignment with the detected direction of motion of the imaging system 100 relative to the object. In still some other examples, the non-mechanical beamsteering device 106 may scan the electromagnetic radiation in alignment with, or opposite, a direction of rotation of the imaging system 100 relative to the object within the scene.

In particular, these additional examples offer various advantages when collecting a Bidirectional Reflectance Distribution Function (BRDF) sample, as discussed herein. For instance, in an example where the optical source 104 includes a linearly polarized illuminator, different scan patterns performed by the non-mechanical beamsteering device 106 may allow the imaging system to determine a BRDF for different polarizations. Moreover, different scan patterns may allow the imaging system 100 to image around obscurants within the scene. For instance, the non-mechanical beamsteering device 106 may continue to adjust to scan pattern, as the imaging system 100 moves relative to the scene, to achieve an optimal view of the object.

In still other examples, the non-mechanical beamsteering device 106 may be configured to scan the electromagnetic radiation over a portion of the scene within an edge region that corresponds to a direction opposite the detected direction of motion of the imaging system (e.g., a "trailing" edge of the instantaneous field-of-view). For example, the beamsteering device may scan the leading edge of the instantaneous field-of-view and the trailing edge of the instantaneous field-of-view in certain implementations. Such an example may provide the benefit of providing additional image data that may have been missed by a scan performed at the leading edge. According to certain examples, since the non-mechanical beamsteering device 106 offers a high scan rate, only a reduced region of the field-of-view of the optical receiver needs to be illuminated instantaneously.

In various examples, the non-mechanical beamsteering device 106 includes a solid-state waveguide, such as a solid-state liquid crystal waveguide. For example, the solid-state liquid crystal waveguide may receive the transmitted beam via a fiber coupling from the optical source 104, and continuously scan the radiation over a range of up to 30° by 5°. In one example, the solid-state liquid crystal waveguide includes a Steerable Electro-Evanescent Optical Reflector offered by Vescent Photonics, Inc. of Golden, Colo. In one embodiment, the non-mechanical beamsteering device 106 may be coupled and in electrical communication with the control circuitry 112. For example, the control circuitry 112 of various embodiments may be configured to apply a control voltage (e.g., an analog control voltage) to the non-mechanical beamsteering device 106 to adjust a refractive index of the non-mechanical beamsteering device 106, and adjust the beamsteering of the non-mechanical beamsteering device 106.

In contrast to conventional beamsteering approaches, which typically require beamforming optics positioned on a pivoted support structure to accurately direct electromagnetic radiation, examples of the non-mechanical beamsteering device 106 discussed herein remove the need for such gimbaled structures. Furthermore, the non-mechanical beamsteering device 106 may be controlled to direct electromagnetic radiation generated by a single optical source (e.g., the optical source 104) over the area of the scene to be imaged. Accordingly, in addition to the various technical advantages discussed above, the non-mechanical beamsteering device 106 of various aspects and embodiments improves the speed and accuracy of the active imaging system 100, as well as reduces the overall weight of the active imaging system 100, when compared to conventional approaches.

As discussed in further detail below, the non-mechanical beamsteering device 106 may be controlled to transmit the electromagnetic radiation in the direction of the scene as a "fan" beam or a "spot" beam. In one example, a "fan" beam includes a beam of electromagnetic radiation having a narrow beamwidth in one dimension (e.g., a horizontal direction), and a wider beamwidth in another dimension (e.g., a vertical direction). In contrast, a "spot" beam may include a beam of electromagnetic radiation having a concentrated area of substantially uniform shape.

For example, the imaging system 100 may include one or more optical elements (e.g., lens) optically coupled with the non-mechanical beamsteering device 106 and positioned so as to adjust a cross-section of the electromagnetic radiation to a shape which corresponds to one or more dimensions of the optical detector 108). For instance, a substantially rectangular cross-section may be beneficial if the scanning pattern performed by the beamsteering device 106 is perpendicular to the direction of motion of the imaging system 100 relative to the scene. In certain other examples, the non-mechanical beamsteering device 106 may rapidly scan electromagnetic radiation having a substantially circular cross-section across the portion of the scene. For instance, the beamsteering device 106 may scan the substantially circular electromagnetic radiation over a single row or column of pixels within the optical detector 108 within an integration time of the detector 108. In another example, the imaging system may include a first optical element which converts a substantially circular cross-section to a rectangular cross-section in a first dimension, and a second optical element which converts the substantially circular cross-section to a rectangular cross-section in a second dimension. In such an example, the non-mechanical beamsteering device 106 may scan the electromagnetic radiation in a substantially "T" shaped pattern, as discussed above. Accordingly, various approaches may be used to achieve a spot beam or a fan beam, as described herein.

As illustrated in FIGS. 1-4, the system 100 may include an optical receiver 108. The optical receiver 108 includes a plurality of individual detector elements, which may be referred to as pixels. For example, in one implementation the optical receiver 108 may include a Focal Plane Array (FPA) having a plurality of pixels arranged in a series of rows and columns. When activated to receive electromagnetic radiation, each pixel of the optical receiver 108 is designed to collect and integrate photons of light impinging on that respective pixel. A circuit associated with each pixel of the optical receiver accumulates charge corresponding to the flux of incident electromagnetic radiation during the integration period. In one implementation, each pixel of the optical receiver 108 may include a complementary metal-oxide semiconductor (CMOS) sensor or a charge coupled device (CCD). In some embodiments, charge-injection devices (CIDs) may also be used for pixels.

In various embodiments, the ROIC 110 is in optical and electrical communication with the optical receiver 108 (e.g., the FPA), and in particular, each pixel of the optical receiver 108. The ROIC 110 is configured to activate each pixel of the optical receiver 108 during the integration period. In particular, the ROIC 110 of various embodiments is configured to activate pixels of the optical receiver 108 to collect reflections of the electromagnetic radiation reflected from the portion of the scene illuminated by the non-mechanical beamsteering device 106. In certain examples, the non-mechanical beamsteering device 106 may adjust a dwell time of the imaging system 100 to compensate for non-uniformities and improve the performance of the optical receiver 108.

"Row" and "column" as used herein, may be interchanged according to various embodiments. That is, although "row" may generally be used to refer to a horizontal positioning and "column" may generally be used to refer to a vertical positioning, as used herein either may be used to refer to a horizontal positioning and a vertical positioning relative to the other.

In various embodiments, the non-mechanical beamsteering device 106 is configured to direct optical radiation over an area of the scene that corresponds to the activated unit cells of the optical receiver 108. In one embodiment, the ROIC 110 is configured to activate one or more unit cells of the optical receiver 108 responsive to direction of the optical radiation by the non-mechanical beamsteering device 106. For example, the ROIC 110 may activate a subset of the plurality of pixels of the optical receiver 108 that corresponds to the leading edge of the instantaneous field-of-view of the optical receiver 108, the trailing edge of the instantaneous field-of-view, or any other subset of the plurality of pixels.

Referring again to FIG. 2, the example optical receiver 108 is shown as receiving reflections of the electromagnetic radiation from the portion of the scene scanned by the non-mechanical beamsteering device 106. In particular, the reflected radiation is received at a subset 204 of the plurality of pixels of the optical receiver 108 which corresponds to an edge region of the instantaneous field-of-view. In particular, the subset of pixels 204 illustrated in FIG. 2 includes a single column of pixels of the optical receiver 108. However, in various other examples the subset 204 may include less than a full row or column of pixels.

In FIG. 3, the optical receiver 108 is shown as receiving reflections of the electromagnetic radiation from the portions of the scene which correspond to an edge region of the field-of-view in a first dimensional direction (e.g., positive y-direction) and an edge region of the field-of-view in a second dimensional direction (e.g., positive z-direction). In particular, within FIG. 3 the first edge region corresponds to a single column of pixels 306 and the second edge region corresponds to a single row of pixels 308. FIG. 4 illustrates the optical receiver receiving reflections of the electromagnetic radiation from the portion of the scene, where the portion includes a substantially center portion of the instantaneous field-of-view. Accordingly, the corresponding subset of pixels 404 is at about the center of the optical receiver 108, and includes less than a full row and/or column of pixels.

After the expiration of the integration period, the ROIC 110 is configured to deactivate each activated unit cell of the optical receiver 108 and read out a value for each deactivated unit cell. Each read out value may be transmitted to other components of the imaging system 100 and used to construct an image of the illuminated portion of the scene, and/or view (e.g., track) one or more features within the scene. In particular, the control circuitry 112 may be configured to generate a plurality of images of the scene during the operation of the imaging system 100. Each image of the scene generated by the control circuitry 112 may be a composition of the portion of the scene scanned by the non-mechanical beamsteering device 106 and one or more images of a previously scanned portion. That is, in certain embodiments the control circuitry 112 is configured to "piece together" an image of the scene from various scans. In one example, the control circuitry 112 may continually refresh a section of the image based on one or more subsequent scans. For example, the control circuitry 112 may continually (e.g., automatically) refresh an area of the image which corresponds to the leading edge(s) of the instantaneous field-of-view of the optical receiver 108.

In certain examples, the optical receiver 108 may collect at least one Bidirectional Reflectance Distribution Function (BRDF) sample. The BRDF sample includes a plurality of variables that define how light is reflected from the scanned portion of the scene. In particular, the BRDF sample may assist the control circuitry 112 in identifying a scanned feature within the scene, or identifying one or more characteristics of that feature, such as a material or orientation of the feature. To collect a given BRDF sample, the non-mechanical beamsteering device 106 may identify a feature within the scene, perform a first scan of that feature, and re-scan that feature once the imaging system 100 has moved relative to the feature.

For example, when collecting a BRDF sample the non-mechanical beamsteering device 106 may first scan a portion of the scene within an edge region of the instantaneous field-of-view of the optical receiver 108. Once the positioning system 102 has detected movement of the imaging system relative to the scene, the non-mechanical beamsteering device 106 may be operated to rescan that same portion of the scene based on the distance traveled and the location of the previously scanned portion. Accordingly, a plurality of scans of a feature, each performed at a different angle relative to an optical axis of the imaging system 100, allow the control circuitry 112 to determine the BRDF of the scanned feature. While described herein as first including a scan that corresponds to an edge portion of the field-of-view, in various other implementations the non-mechanical beamsteering device 106 may first scan other portions of the scene within the field-of-view of the optical receiver 108, and subsequently scan a portion that corresponds to an edge region.

Referring again to FIG. 1, in various embodiments the imaging system 100 may include control circuitry 112 coupled and in electrical communication with components of the active imaging system. For example, the control circuitry 112 may be in electrical communication with the ROIC 110, the optical source 104, the non-mechanical beamsteering device 106, and the positioning system 102. The control circuitry 112 may include a single controller; however, in various other embodiments the control circuitry 112 may consist of a plurality of controllers and/or other control circuitry. In particular, the control circuitry 112 may include a plurality of components such as a waveguide generator coupled to a waveguide controller and/or one or more components of the positioning system 102.

The control circuitry 112 may include a combination of software-configured elements, signal processing circuitry, application specific integrated circuitry, infrared-frequency integrated circuitry, or any combination of various hardware and logic circuitry for performing the various processes discussed herein. For instance, the control circuitry 112 of various embodiments may include a processor core, memory, and programmable input/output components. The control circuitry 112 may be configured to automatically and/or dynamically control various components of the imaging system 100, such as the non-mechanical beamsteering device 106.

Figure 5:
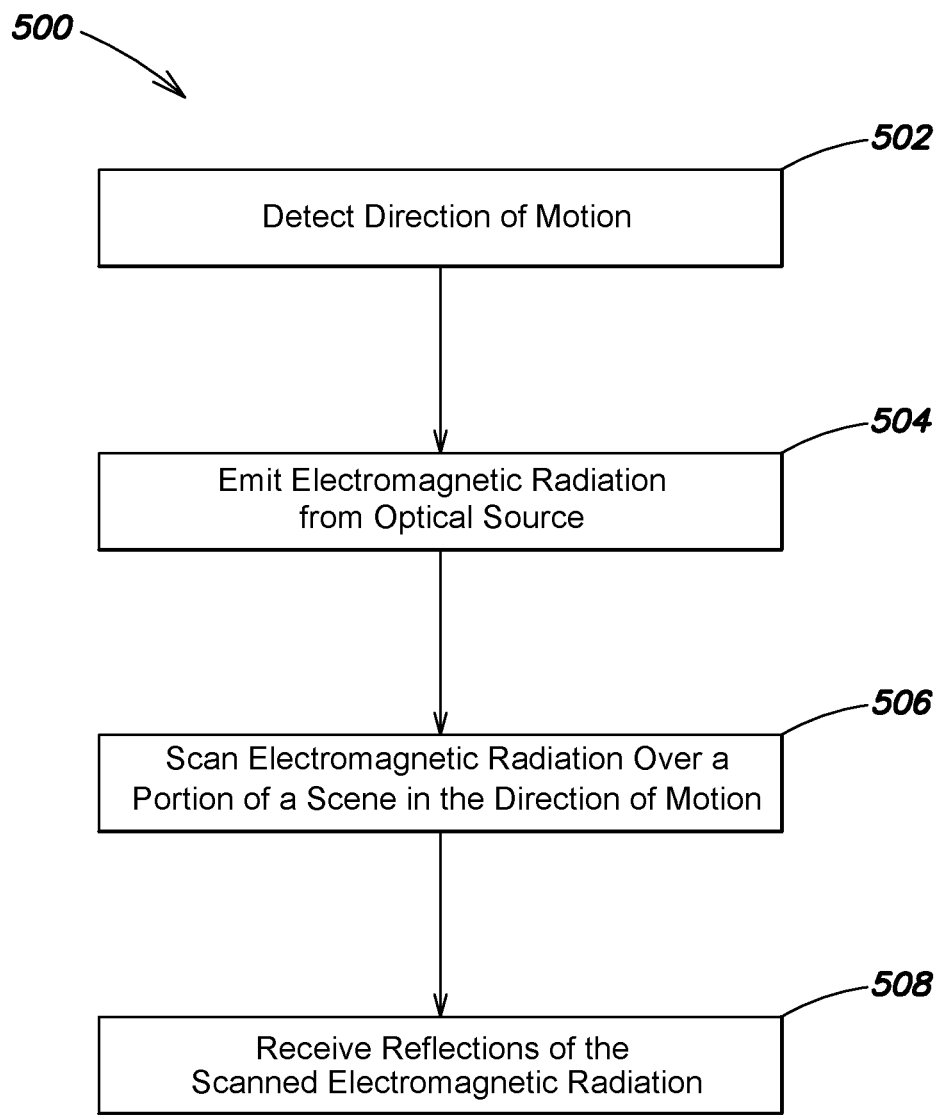
FIG. 5 is an example process flow according to aspects of the invention.

As described above with reference to FIGS. 1-4, several embodiments perform processes that improve known schemes for active imaging. In some embodiments, these processes are executed by an active imaging system, such as the active imaging system 100 described above with reference to at least FIG. 1. One example of such a process is illustrated in FIG. 5. According to this example, the process 500 may include the acts of detecting a direction of motion, emitting electromagnetic radiation from an optical source, scanning the electromagnetic radiation over a portion of the scene corresponding to an edge region of a field-of-view in the direction of motion, and receiving reflections of the electromagnetic radiation at an optical receiver. The example process 500 of FIG. 5 is described with continuing reference to the imaging system 100 illustrated in at least FIG. 1.

In act 502 the process 500 may include, detecting a direction of motion relative to a scene to be imaged. In certain examples, detecting the direction of motion may include detecting the direction of motion within a single-dimensional direction, while in other examples detecting the direction of motion may include detecting the direction of motion within a two-dimensional direction. As further discussed above, each dimensional direction (e.g., a first dimensional direction, a second dimensional direction, etc.) may be orthogonal to the other dimensional directions. In certain examples, detecting the direction of motion may include receiving a plurality of GPS positioning signals and determining a direction of movement of the imaging system 100 based on ascertained coordinates. However, in certain other examples, the process 500 may include detecting the direction of motion of the imaging system 100 relative to the scene based at least in part on a variation of a feature within the scene between one or more images of the scene. For example, the process 500 may include detecting a direction of motion of the scene based on movement of a feature, within the scene, between consecutively generated images of the scene.

In act 504, the process 500 may include emitting electromagnetic radiation from the optical source along the transmit path. In act 506, the process 500 may further include scanning the electromagnetic radiation over at least a first portion of the scene. While act 506 is illustrated in FIG. 5 as following act 504, in practice, act 506 may occur before or at the same time as act 504. That is, in certain other examples, acts 502-508 may be performed in an order other than that illustrated in FIG. 5. As discussed with reference to FIG. 1, the first portion of the scene may correspond to an edge region of an instantaneous field-of-view of the optical receiver 108, in the direction of motion of the imaging system 100. In certain examples, the process 500 may further include scanning the electromagnetic radiation over at least a second portion of the scene, where the second portion of the scene corresponds to a second edge region of the instantaneous field-of-view of the optical receiver 108. In such an example, the direction of motion of the imaging system 100 may be in a two-dimensional direction, the first portion of the scene corresponding to the first dimensional direction and the second portion of the scene corresponding to the second dimensional direction. As also discussed with reference to FIG. 1, in certain examples the process 500 may include locating the portion of the scene to be scanned based on the detected direction of motion.

In act 508, the process 500 may include receiving, within the instantaneous field-of-view of the optical receiver 108, reflections of the electromagnetic radiation from at least the scanned portion of the scene (e.g., the first portion and/or second portion). In particular examples, the process 500 may further include activating a subset of the plurality of pixels of the optical receiver to collect the reflections of the electromagnetic radiation. In particular examples, the subset of the plurality of pixels corresponds to the edge region(s) of the instantaneous field-of-view. Specifically, activating the subset of the plurality of pixels includes activating at least one of a single row of pixels or a single column of pixels of the optical receiver 108. Such pixels may be positioned at a perimeter of the optical receiver 108.

While not explicitly illustrated or described with reference to FIG. 5 for the convenience of description, the example process 500 illustrated therein may include further acts and processes. Examples of these additional acts and processes are described with reference to the example active imaging system 100 illustrated in FIGS. 1-4.

Accordingly, various aspects and embodiments discussed herein provide an active imaging system configured to perform rapid imaging scans based on the real-time movements of the imaging system, while also maintaining a reduced weight, size, and power consumption. Specifically, certain examples may scan a leading edge, a trailing edge, or other desired sections of a scene that are less than an entire instantaneous field-of-view of the receiver. Such examples offer the benefit of improved imaging efficiency, in addition allowing the recapture of missed image data, recapture of image data from desired sections of the scene, and dynamic tracking of features within the scene. Such features are particularly beneficial when the imaging system (and/or features within the scene) is in motion.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An active imaging system comprising:
a positioning system configured to detect motion and a direction of the motion of the imaging system relative to a scene to be imaged;
an optical source positioned to emit electromagnetic radiation along a transmit path; a non-mechanical beam steering device positioned along the transmit path to receive the electromagnetic radiation from the optical source and configured to scan the electromagnetic radiation over at least a first portion of the scene within an instantaneous field-of-view of an optical receiver and to re-scan the electromagnetic radiation over the first portion of the scene after the motion of the imaging system relative to the scene has been detected by the positioning system;
the optical receiver positioned to receive reflections of the electromagnetic radiation from at least the first portion of the scene within the instantaneous field-of-view, the first portion of the scene being within a first edge region of the instantaneous field-of-view of the optical receiver, the first edge region being in the direction of the motion of the imaging system, the optical receiver being further configured to collect at least one Bidirectional Reflectance Distribution Function (BRDF) sample from the first portion of the scene; and
control circuitry coupled to the positioning system and to the optical receiver, the control circuitry configured to locate the first portion of the scene within the instantaneous field-of-view of the optical receiver based at least in part on the direction of the motion of the imaging system, the control circuitry being further configured to identify at least one characteristic of a feature within the first portion of the scene based at least in part on the BRDF sample.

2. The active imaging system according to claim 1, wherein the optical receiver is a focal plane array including a plurality of pixels arranged in a series of rows and columns.

3. The active imaging system according to claim 2, further comprising a Read-Out Integrated Circuit (ROIC) coupled to the focal plane array and configured to activate a subset of the plurality of pixels of the focal plane array to receive the reflections of the electromagnetic radiation, wherein the subset of the plurality of pixels corresponds to the first edge region of the instantaneous field-of-view.

4. The active imaging system according to claim 3, wherein the subset of the plurality of pixels includes at least one of a single row of pixels or a single column of pixels.

5. The active imaging system according to claim 1, wherein the positioning system is further configured to detect the direction of the motion within a first single-dimensional direction within a plane of the optical receiver, and wherein the first edge region of the instantaneous field-of-view is in the direction of the motion of the imaging system within the first single-dimensional direction.

6. The active imaging system according to claim 5, wherein the positioning system is further configured to detect the direction of the motion within a two-dimensional direction, and wherein the two-dimensional direction includes the first single-dimensional direction and a substantially orthogonal second single-dimensional direction within the plane of the optical receiver.

7. The active imaging system according to claim 6, wherein the non-mechanical beamsteering device is further configured to scan the electromagnetic radiation over at least a second portion of the scene, and wherein the second portion of the scene corresponds to a second edge region of the instantaneous field-of-view of the optical receiver in the direction of the motion of the imaging system within the second single-dimensional direction.

8. The active imaging system according to claim 1, wherein the control circuitry is further configured to generate a plurality of images of the scene, wherein at least one image of the plurality is a composition of an image of the first portion of the scene and a previous image.

9. The active imaging system according to claim 1, wherein the positioning system includes a global positioning system (GPS).

10. The active imaging system according to claim 1, wherein the non-mechanical beamsteering device includes a liquid crystal waveguide.

11. The active imaging system according to claim 1, wherein the optical source includes an active laser source configured to emit shortwave infrared (SWIR) radiation in a wavelength range of approximately 0.9-1.7 micrometers.

12. The active imaging system according to claim 1, wherein the control circuitry is configured to generate a plurality of images of the scene, wherein the positioning system is configured to detect the direction of the motion of the imaging system relative to the scene based at least in part on a variation of the feature within the scene between a first image of the plurality of images and a second image of the plurality images.

13. A method of optical imaging, the method comprising:
detecting motion and a direction of the motion relative to a scene to be imaged;
emitting electromagnetic radiation from an optical source along a transmit path;
scanning the electromagnetic radiation over at least a first portion of the scene, the first portion of the scene corresponding to a first edge region of an instantaneous field-of-view of an optical receiver, in the direction of the motion;
receiving, within the instantaneous field-of-view of the optical receiver, reflections of the electromagnetic radiation from at least the first portion of the scene;
identifying a feature within the first portion of the scene;
rescanning the electromagnetic radiation over the first portion of the scene after the motion relative to the scene has been detected to collect at least one Bidirectional Reflectance Distribution Function (BRDF) sample from the first portion of the scene; and
identifying at least one characteristic of the feature within the first portion of the scene based at least in part on the BRDF sample.

14. The method according to claim 13, further comprising activating a subset of a plurality of pixels of the optical receiver to receive the reflections of the electromagnetic radiation, wherein the subset of the plurality of pixels corresponds to the first edge region of the instantaneous field-of-view.

15. The method according to claim 14, wherein activating the subset of the plurality of pixels includes activating at least one of a single row of pixels or a single column of pixels of the optical receiver.

16. The method according to claim 13, wherein detecting the direction of the motion includes detecting the direction of the motion within a first single-dimensional direction within a plane of the optical receiver, and wherein the first edge region of the instantaneous field-of-view is in the direction of the motion within the first single-dimensional direction.

17. The method according to claim 16, wherein detecting the direction of the motion includes detecting the direction of the motion within a two-dimensional direction, and wherein the two-dimensional direction includes the first single-dimensional direction and a substantially orthogonal second single-dimensional direction within the plane of the optical receiver.

18. The method according to claim 17, further comprising:
scanning the electromagnetic radiation over at least a second portion of the scene,
wherein the second portion of the scene corresponds to a second edge region of the instantaneous field-of-view of the optical receiver in the direction of the motion within the second single-dimensional direction.

19. The method according to claim 13, wherein identifying the at least one characteristic of the feature includes identifying at least one of a material of the feature and an orientation of the feature.

20. The method according to claim 13, further comprising determining the BRDF of the feature.

21. The active imaging system according to claim 1, wherein the at least one characteristic of the feature is at least one of a material of the feature and an orientation of the feature.

* * * * *